Aug. 18, 1925.

E. G. McCAULEY 1,550,550

HYDRAULIC CONTROL SYSTEM

Filed April 8, 1924 4 Sheets-Sheet 2

INVENTOR
*Ernest G McCauley*
BY
*Robert H Young*, ATTORNEY

Aug. 18, 1925.

E. G. McCAULEY 1,550,550

HYDRAULIC CONTROL SYSTEM

Filed April 8, 1924    4 Sheets-Sheet 3

FIG. 4.

INVENTOR
Ernest G. McCauley
BY
Robert H. Young    ATTORNEY

Patented Aug. 18, 1925.

1,550,550

UNITED STATES PATENT OFFICE.

ERNEST G. McCAULEY, OF DAYTON, OHIO.

HYDRAULIC CONTROL SYSTEM.

Application filed April 8, 1924. Serial No. 705,047.

*To all whom it may concern:*

Be it known that I, ERNEST G. McCAULEY, a citizen of the United States, residing at Dayton, in the county of Montgomery and State of Ohio, have invented certain new and useful Improvements in Hydraulic Control Systems, of which the following is a specification.

This invention relates to hydraulic or fluid control systems generally, and is herein more particularly concerned with a hydraulic or fluid control system capable of use in connection with a reversible or adjustable pitch propeller for airplanes and in connection with four wheel hydraulic or fluid brakes on automotive vehicles.

One of the principal objects of the invention is to provide a control system of this character which enables the movement or adjustment of the propeller or brake as desired and further operates to hold the same in adjusted position, the purpose being, in the case of an airplane propeller, to adjust the propeller and secure the same in its adjusted position for continuous operation of the plane and in the case of an automotive vehicle brake to enable setting the brakes and keeping them set after the manner of an emergency brake to hold the car parked on a hill. Another object of the invention is to provide a system of this character, utilizing the oil pump of the engine for the source of hydraulic pressure and wherein a reserve pressure tank is provided for storing pressure during the operation of the engine to be used when the engine is idle. The entire system operates with the oil for lubrication.

The invention, as will be pointed out hereinafter, is capable of adaptation to a great variety of uses and may, for example, be used to control a marine propeller in place of the propeller of an airplane, or may be used, in connection with aircraft wheel brakes in place of the automotive vehicle brakes, and likewise is capable of use in hydraulic transmissions, controls for ailerons, stabilizers, or rudders on airplanes or in connection with steering means or the like in radio-controlled devices as well as in divers other connections.

The invention is illustrated in the accompanying drawings in which.

The same or similar reference numerals are applied to corresponding parts throughout the views.

Figure 1:
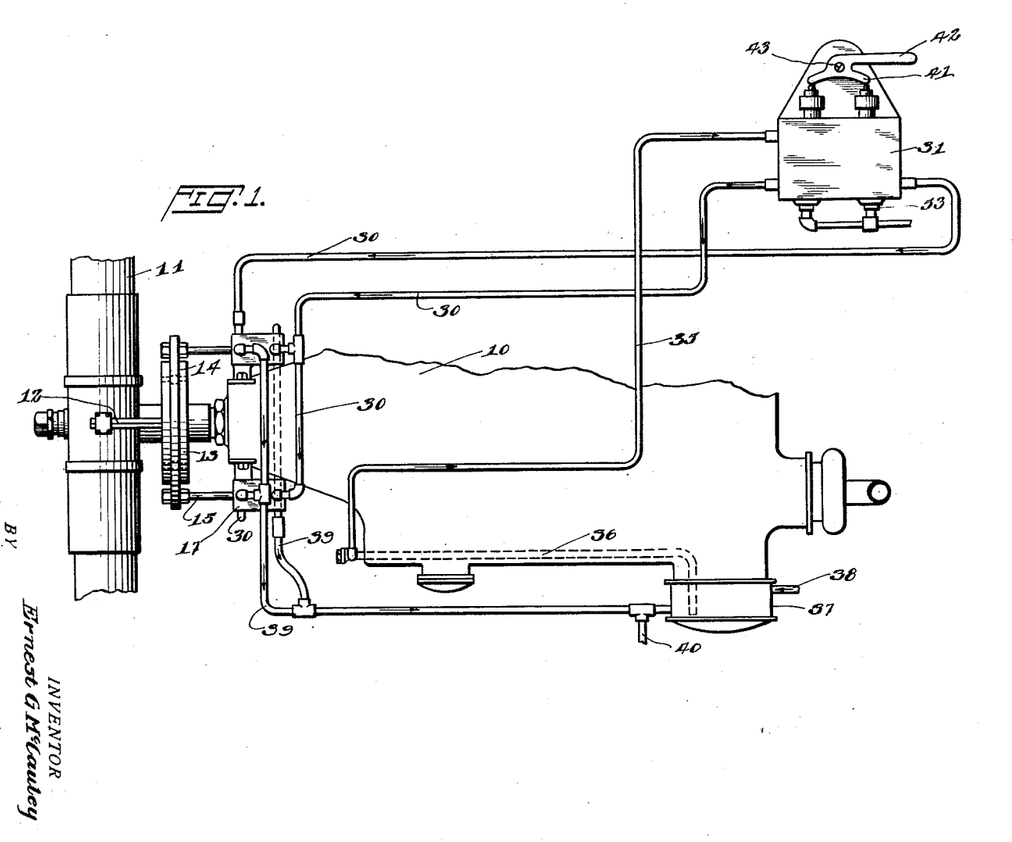
Fig. 1 is a fragmentary and more or less diagrammatic view of the hydraulic control system of my invention shown applied to use as a means for controlling the pitch of the propeller of an airplane and operating as an incorporated part of the pressure oiling system of the airplane engine.

The hydraulic control system of the present invention is shown applied to use in connection with an aircraft engine 10 to adjust and reverse the blades of the propeller 11 of the aircraft. Adjustable and reversible pitch propellers are well known in the art and it will not be necessary therefore to go into the matter of describing the details of the mechanism incorporated in the propeller hub to secure such adjustment and reversal of the blades. Furthermore these details do not form part of the present invention except only in so far as they cooperate as a part of the general combination herein shown. Any suitable or preferred form of reversing or adjusting mechanism per se may be used and for the present purposes, it will suffice to say that a rod 12 on each side of the propeller hub is suitably connected to one of the propeller blades to produce the desired angular adjustment thereof when the yoke 13 on which the arms 12 are carried is moved forwardly and rearwardly. The particular mode of connection of the yoke with its operating means is likewise unimportant and is herein shown as comprising merely a ring 14 having roller bearings between it and the yoke 13, permitting rotation of the propeller relative to the operating means. The ring 14 has a pair of piston rods 15 bolted or otherwise held thereon extending rearwardly through glands 16 into a pair of cylinders 17.

Figure 3:
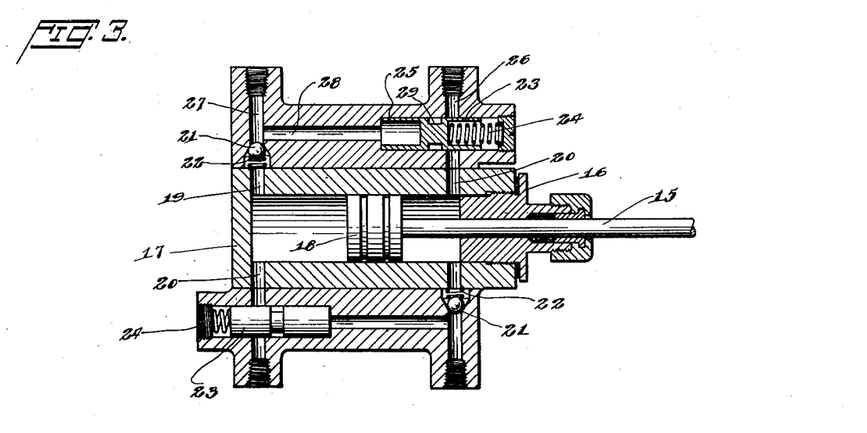
Fig. 3 is a central longitudinal section through one of the control cylinders showing one of the pistons used in changing the aspect of one of the blades of the propeller.

The cylinders 17 are disposed in diametrically opposed relation relative to the ring 14 and are conveniently mounted stationarily upon the forward end of the crank case of the engine 10 as shown. The rods 15 have pistons or other pressure responsive means 18 on their inner ends moving with a close fit in the cylinders 17. Movement is communicated to the pistons by admitting pressure fluid to either side thereof to either end of the cylinder so that the piston is moved in either direction as desired to secure any desired adjustment of the propeller blades. The cylinders each have an inlet opening 19 and an outlet opening 20 at the opposite ends thereof, permitting the influx of pressure fluid at one end of the cylinder and the simultaneous escape of fluid from the opposite end from in front of the piston when the latter is moved under the action of the pressure fluid. Ball check valves 21 are provided for each of the inlet openings 19 which are held normally seated outwardly by springs 22 to close the inlet openings. The escape of fluid through the outlet openings 20 is controlled by cylindrical plunger valves 23 normally held closed by springs 24. Valves 23 operate in small chambers 25 which intersect ducts 26 extending from the outlet openings 20. The chambers 25 are in communication with ducts 27 leading to the inlet openings 19 through longitudinal ducts 28. The arrangement is such that when pressure fluid is supplied to one of the inlet openings the valve 23 at the opposite end of the cylinder is moved against the tension of its spring to open the outlet at that end of the cylinder. This permits fluid from in front of the piston to escape as the piston is moved forward by the pressure fluid behind it. The plunger valves 23 have annular grooves 29 in the walls thereof which register with the ducts 26 at the extremity of the movement of the valves, thereby permitting the escape of fluid through the outlet openings.

It is apparent that when the pressure fluid is applied in the manner stated the check valves 21 open to admit the fluid to the cylinders and the valves 23 at the other end of the cylinders open to permit the escape of fluid from that end. In other words, as fluid is supplied to one end of a cylinder behind the piston to move the latter forward, fluid from in front of the piston is permitted to escape from the cylinder. When the pressure fluid is shut off, both the valves 21 and 23 close and thereby trap the fluid in the cylinders on both sides of the pistons therein and lock the pistons in their adjusted position. It is further apparent that the admission of pressure fluid through an inlet opening to one end of the cylinder and its simultaneous escape through an exhaust opening at the other end is not accompanied by any passage of fluid through the other openings since the valves in these openings remain closed.

The cylinders 17 have their inlet openings 19 supplied with pressure fluid through pipes 30 extending from a valve casing 31 which is located at some point where it may be conveniently reached to be manually operated. In the present case the valve is located in the cockpit of the airplane or at some point within convenient reach of the pilot. The casing 31 has two chambers 32 which are connected with the inlet openings at the opposite ends of the cylinder 17. The pressure supply chamber 33 communicates with either of the chambers 32 when either of the valves 34 opening therein is opened so that the pressure fluid may be supplied selectively to either end of the cylinders 17 to operate the pistons in either direction as desired. The supply chamber 33 has a pipe 35 extending therefrom to another pipe 36 in the crank case of the engine 10 leading to the oil pump 37 or may be supplied with a pressure fluid from a source independent of the engine. The pump 37 is supplied from a suitable reservoir through a pipe 38. There are also pipes 39 which extend from the outlet openings of the cylinders 17 to the atmospheric pressure or suction side of the pump 37 and a tap 40 off the pipes 39 may be provided communicating with the reservoir (not shown) so that in case the pump is full the oil will seek its way to the oil reservoir and will be fed from there to the pump.

Figure 5:
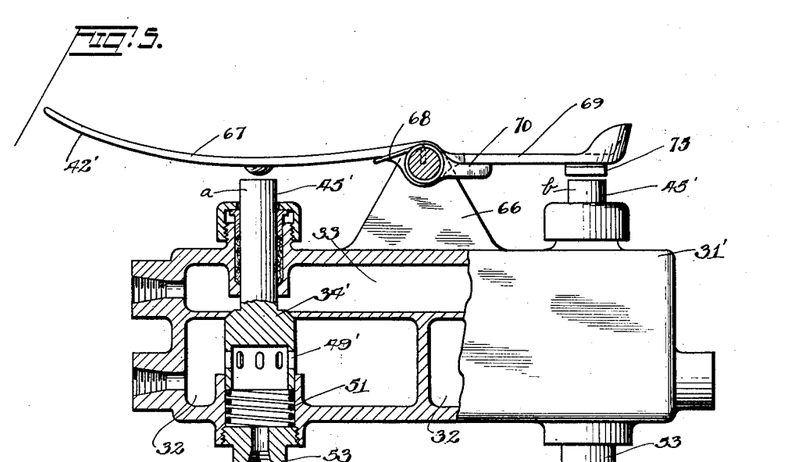
Fig. 5 is a side view of a brake and accelerator pedal assembly, operating in connection with a valve similar to that of Fig. 2.

The valves 34 are disposed side-by-side, each controlling admission of pressure fluid to one of the chambers 32 and are each arranged to be operated by a tappet 41 extending from a manually controlled lever 42 pivoted at 43 on a lug 44 extending from the casing 31. The valves 34 have their stems 45 extending upwardly to a point beneath the tappets 41 through glands 46. The stems 45 are hollow and receive with a telescoping fit the stems 47 of valves 48 controlling atmospheric openings 49 in a depending cylindrical wall 50 on valves 34. The valves 34 are normally held seated by springs 51 and the valves 48 are normally held away from the openings 49 by springs 52. The stems 47 of the valves 48, being hollow, maintain the interior of the chambers 32 through the openings 49 at atmospheric pressure except when the valves 34 are opened; thus the fluid in the piping 30, leading to the inlet openings of the cylinders 17, is normally under no pressure. The outlets 53 to the pump 37 also produce a condition of atmospheric or even sub-atmospheric pressure in the chambers 32, since that is the pressure on the intake side of the pump. For this reason the valves 48 may be dispensed with, and the stems of the valve 34 may be made solid as shown in Fig. 5, or if desired the valves 48 may be provided using solid stems instead of the hollow stems shown in Fig. 2. This feature of maintaining a condition of no pressure in the lines reduces the possibility of leakage at the joints in the system. It will be noted that the stems 47 of the valves 48 extend beyond the ends of the stems 45 of the valves 34 so that they are engaged first by the tappets 41 in the opening of the valves 34. Also in the closing of the valves 34, the atmospheric openings are not uncovered until the valves 34 are seated. The fluid in the pipes is therefore relieved of pressure practically as soon as the valve 34 is closed, so that the valves 21 and 23 in the cylinders 17 seat instantly and lock the pistons 18 in their adjusted position. There is a slight backflow of fluid from the piping 30 upon the closing of the valve 34 and the uncovering of the atmospheric openings 49. This fluid is allowed to drain from the chamber 32 through the openings 49 out through outlets 53 to the reservoir above referred to. A vent 48' is provided in the stem 47 of valve 48 to relieve any dash-pot action in the operation of the valve and thereby insure that the valve will move clear of the atmospheric openings 49 in the closing of the valve 34.

Figure 2:
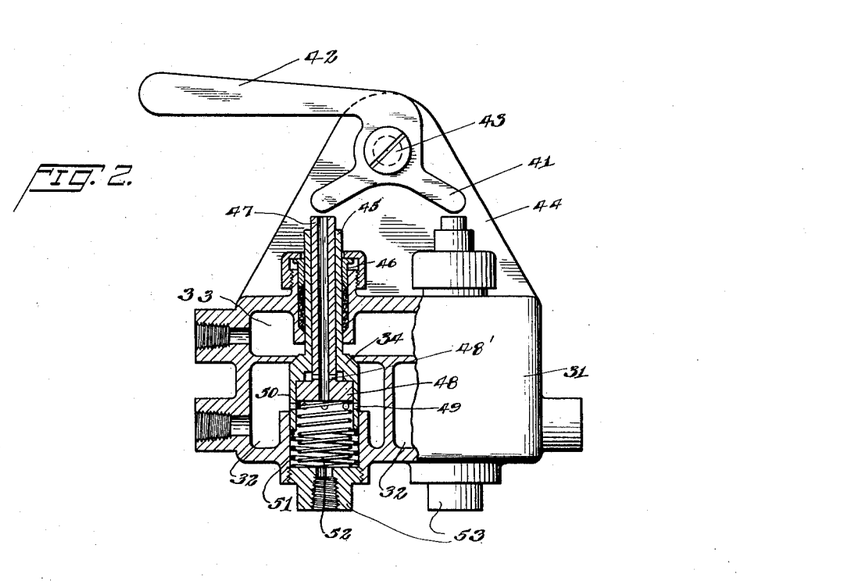
Fig. 2 is a view partly in section and partly in elevation of the manually controlled valve forming a part of the system.

It will be seen, considering the arrangement of valves for the cylinders 17 with the operation of the valves 34 as just described, that pressure fluid is supplied to either end of the cylinders 17 depending upon which of the valves 34 has been operated, and that the influx of fluid to one end of the cylinders and the simultaneous escape from the other end is permitted by the operation of the valves 21 and 23, as above described. It is also apparent that when the valve 34 is closed the fluid in ducts 26 and in the piping 30 which communicates therewith is at atmospheric pressure due to the maintaining of the fluid at atmospheric pressure in the chambers 32. The valves 21 and 23 are therefore free to close and do close practically the instant pressure is shut off. The action of the pistons is therefore positive and accurate adjustment of the propeller blades can be secured. The blades are held securely in their adjusted positions and are not permitted to come out of adjustment due to any backflow or leakage of fluid past the valves 21 and 23.

Figure 4:
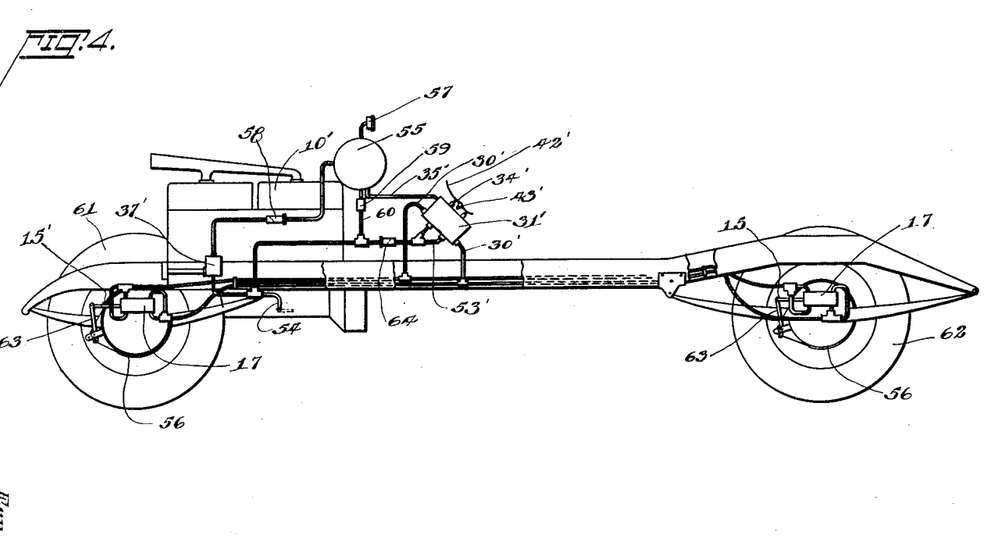
Fig. 4 is a view similar to Fig. 1, showing the application of the system to use with four wheel hydraulic brakes on an automobile.

In Fig. 4 the system of my invention is shown applied to use with four wheel hydraulic or fluid brakes on an automobile. The thought here is to provide a source of pressure in connection with the brake cylinders and a pedal-operated valve to control the admission of pressure fluid to the cylinders to operate the brakes. The pedal, for simplicity, is of a form which when tilted by depressing the toe or heel will serve to set the brakes and when the same is tilted oppositely by a different depression of the pedal, will release the brakes. This arrangement in and of itself enables the dispensing with the usual forms of emergency brakes which are ordinarily used for holding the car when parked on a hill. The added braking effect secured in a four wheel hydraulic brake outfit is considered sufficient to enable the dispensing with the emergency brake as an additional precaution for use in an emergency where the ordinary foot-operated service brake would not suffice. In the event it is desired to set the brakes at a time when the engne is not running, or where the source of pressure is in a device operating independent of the engine, and the device is idle the invention provides a reserve pressure tank in the system to afford pressure at any time it is needed. While it is not ordinarily found necessary or desirable, in the case of an airplane, to provide a reserve pressure tank by which means the propeller blades might be adjusted when the engine is not running, it is nevertheless within the contemplation of the invention to include a tank in a system on an airplane, if that is desired. In the drawing, the engine 10' has an oil pump 37' driven from the engine which receives oil from the crank case through a pipe 54 and forces the oil into a reserve pressure tank 55 located at some convenient point on the chassis. The pressure in the tank 55 is maintained under a cushion of compressed air pocketed in the tank, at a certain desired value deemed sufficient for the operation of the vehicle brakes 56. A gage 57 on the tank indicates the pressure therein. A check valve 58 between the pump 37' and the tank 55 prevents any back-flow when the engine or other pressure source is idle. A pressure relief valve 59 is provided in a return pipe 60 leading back to the pump or directly to the crank case. This valve allows a leakage of pressure above that which it is desired to maintain. The valve casing 31 in which the valves 34' are mounted is carried suitably upon the toe board to be within convenient reach of the driver for operation, by a foot pedal 42' pivoted at 43' between the valves 34'. The casing 31' is supplied with pressure fluid from the tank 55 by pipe 35. This pressure is controlledly admitted to either end of the brake cylinders 17 for front and rear wheels 61 and 62 of the vehicle through pipes 30' which connect with pipes or conduits on the chassis leading to the cylinders 17. The operation of the pistons in cylinders 17' is precisely the same as the pistons in cylinders 17, as above described. In this case the rods 15′ are connected with levers 63 to contract the bands 56 on the brake drums of the wheels upon a movement of the pistons to the left. As the arrangement is shown, this movement would correspond to a depression of the heel of the pedal 42′. The pipes or conduits both serve to conduct pressure to the cylinders, and conduct fluid therefrom by virtue of the connection by loops, as shown, of the inlet and outlet openings at the same ends of the cylinders. The rapidity with which the valves 34′ are opened determines the braking effect secured and a slight or greater effect is secured as the driver desires, according to the emergency.

Figures 6, 7:
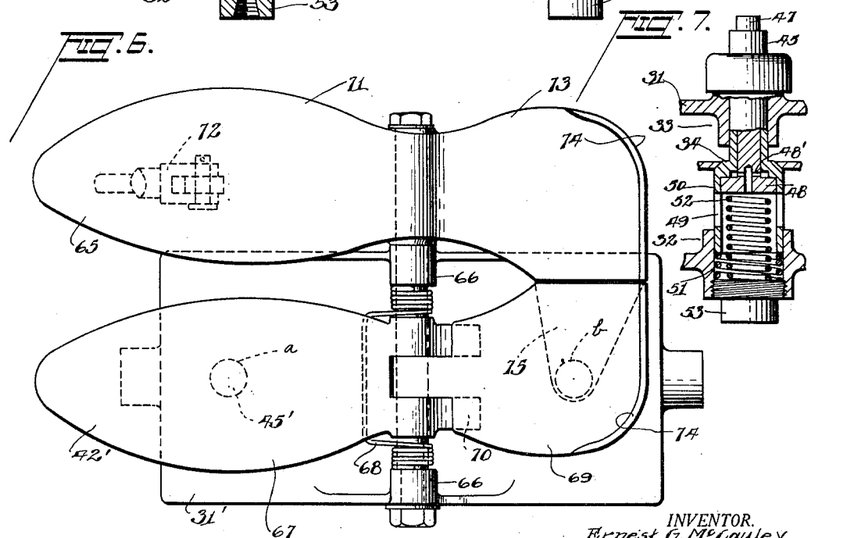
Fig. 6 is a plan view of Fig. 5.
Fig. 7 is a section of a modified form of control valve.

A further method of providing distribution of pressure to the cylinders gradually, may be made possible by elongating or enlarging the openings 49 of valve 34 which may be used with or without valve 48, as shown in Figs. 7 and 5. Then when the valve 34′ is slightly opened, instead of the maximum pressure being admitted practically at once to the cylinder, a part of the pressure will by-pass through the openings 49, thereby lowering the pressure in lines 30′ until the valve 34 has been opened sufficiently to close the openings 49 entirely. Then the line 30′ will be subjected to the maximum pressure, if that is desired.

If after the vehicle has been brought to a standstill, or for any other reason it is desired to release the brakes, the depression of the toe on the pedal 42′ will produce the release of the brakes by a retraction of the piston rods 15′. The draining of the casing 31′ to the crank case is secured by pipes 53′ tapping into the bottom of the casing 31. A check valve 64 is provided between the return pipe 60 from the pressure relief valve 59 and the pipes 53′, in order to avoid the possibility of fluid in pipes 53′ being subjected to pressure in case there is an overflow of pressure from tank 55.

It will be understood that two control valves 31 may be utilized whereby the front and rear wheel brakes may be operated as separate units. The application of such an arrangement is obvious and requires no further explanation. Likewise suitable connections may be made with the accelerator pedal so that pressing down on the accelerator pedal will always release the brakes before the engine is accelerated. This is illustrated in Figs. 5 and 6.

Referring to Figs. 5 and 6, the brake pedal is mounted alongside an accelerator pedal 65 on bearings 66, on a valve casing 31′. The latter is generally similar to the valve casing shown in Fig. 2 with the exception that the valves 34′ are spaced farther apart for convenience in operating the same by the pedals, and furthermore in the provision of solid stems 45′ for each of the valves 34′ in place of the hollow stems, shown in Fig. 2. The atmospheric openings 49′ are shown elongated for the purpose above described, namely, for effecting a gradual increase or decrease in pressure in the application or release of the brakes. The valve 48 used in Fig. 2 for controlling the atmospheric openings are dispensed with, in view of the fact that the chambers 32 are subject to atmospheric pressure through the outlets 53, which communicate with the intake or suction side of the pump. The latter furnishes the chamber 33 with pressure of a constant value, determined by the setting of a relief valve, such as that shown at 59.

In the present arrangement the toe 67 of the brake pedal 42′ operates the valve 34′ designated $a$, for the purpose of distinguishing it from the other valve $b$ of the valve casing 31′. The valve $a$ when opened admits pressure fluid from the chamber 33 to the chamber 32, and thence through the line connecting the brake cylinder with the casing 31′ to apply the brakes. The initial opening of the valve produces only a slight pressure in the line, because of the fluid being permitted to by-pass through the ports 49′ back to the pump. The more the valve is opened the more the ports 49′ are restricted, so that in the depression of the toe 67 of the brake pedal there is a gradual increase of pressure resulting in the line leading to the brake cylinder. Finally the ports 49′ are entirely closed and full pressure is communicated to the pistons in the brake cylinders. This pressure may or may not be sufficient to lock the wheels as desired. The reverse action occurs as the toe of the pedal is released, and the pedal rises to a neutral position preferably under the action of a spring, such as that shown at 68. In this case the full pressure is diminished the moment the valve 34′ commences to close, and uncovers the ports 49′, to permit by-passing of pressure fluid to the pump. The closer the valve approaches closed position, the less the pressure becomes until finally upon the actual closing of the valve, the pressure in the line becomes atmospheric, due to the continued communication through the ports 49′ with the intake of the pump.

The toe 67 of the brake pedal 42′ is separate from the heel 69 thereof, it being possible to elevate the toe without depressing the heel. The toe is connected with the heel by lugs 70 underlying the heel to insure elevating the heel upon depression of the toe, thus pressure cannot be supplied for applying the brakes, while at the same time pressure is being supplied to release the brakes. The accelerator pedal 65 has the toe 71 thereof connected in any usual or desired manner with the carburetor, by means indicated at 72. Such connections, it will be understood, ordinarily include a spring or springs for normally returning the accelerator pedal to an elevated position, thus the toe 71 will be normally raised approximately the same amount as the toe 67 of the pedal 42' in its released position. The heel 73 of the pedal 65 similarly to the heel 69 of the pedal 42' is provided with an upwardly extending lip 74 at the rearmost edge for guiding the heel of the shoe in movement from one pedal to the other, and in keeping the shoe in proper position on the pedal. The heel 73 of the pedal 65 has an extension 75 underlying the heel 69 of the pedal 42', and overlying the valve $b$ above referred to. It will be seen that in a system of the type hereinabove described, wherein the brakes may be applied and positively locked in applied condition, it is desirable to dispense with an extra operation to release the brakes, and through the arrangement just described I am enabled to accomplish the releasing of the brakes coincident with the acceleration of the car, at which time there is no further purpose in having the brakes applied. The thought is to release the brakes by the depression of the heel. This may be done either by depressing the heel 69 of the brake pedal 42' directly, or by depressing the heel 73 of the accelerator pedal 65. Assuming that the brakes have been applied and the car is to be again accelerated and the brakes released, the driver may shift his foot from the brake pedal immediately to the accelerator pedal, and upon finding the pedal with his foot there will be a natural tendency the instant he desires to depress the accelerator pedal to lift the heel for this operation. In coming down with the heel, the valve $b$ will be depressed and the brakes released. There is thus no danger of running the car with the brakes applied. Neither is there any danger or at least much danger of having the valve $b$ constantly depressed while the car is running, since in all acceleration it is impossible to depress either the heel 69 of the pedal 42' or the heel 73 of the pedal 65. The arrangement is also of advantage where the car has been parked on a hill or other place and left with the brakes applied. In such a case after the starter button has been depressed and the engine turned over to start, the instant the driver seeks the accelerator pedal, the heel will be depressed as he comes down with his foot upon the pedal, and thereafter the heel will again be elevated and will be apt to be held elevated so long as the car is in normal operation with the accelerator pedal depressed.

It will be understood however, that there is no harm done by the repeated or even continuous opening of the valve $b$, since this operation in such an instance will serve merely to insure the backing of the piston and the releasing of the brakes to their utmost. The pressure on tap in the tank 55 which is otherwise being by-passed by the relief valve 59 to relieve excessive pressure, will in such a case pass through the chamber 32 identified with the valve $b$, and be passed to the pump through the circuit. The arrangement described is provided more for the purpose of enabling an automatic or semi-automatic releasing of the brakes upon acceleration of the car, than from a desire to avoid continuous or repeated operation of the brake releasing valve, although it is desirable to avoid such operation from the standpoint of avoiding having pressure continuously or repeatedly in the line communicating with the brakes.

I claim:

1. In a fluid control system, a part to be operated, piston means connected therewith, a cylinder having said piston operating therein, a source of pressure fluid supply, a manually controlled valve to admit pressure fluid from said source to said cylinder, a reserve source of pressure fluid supply also communicating through said valve with said cylinder, means to trap pressure in said reserve source for use when said main source is idle, and means to relieve excess pressure in said reserve source.

2. In a fluid control system, a part to be operated, a cylinder, a piston therein connected to said part, an engine for propelling the vehicle on which said system is installed having a pump for pumping a nonfreezing hydraulic fluid, such as the lubricating oil of the engine, for providing a source of pressure fluid supply, a pressure reservoir supplied by said engine when the latter is running and maintaining the fluid under a reserve pressure by a cushioning means, such as compressed air, for use when the engine is idle, and a manually controlled valve for admitting pressure fluid from said reservoir to said cylinder.

3. In a fluid control system, a part to be operated, a cylinder, a piston therein connected to said part, an engine having a pump driven thereby to provide fluid under pressure for the system, a reserve pressure tank, a check valve between said tank and said engine for trapping pressure in said tank for use where said engine and pump are idle, and a manually controlled valve for admitting pressure fluid from said pump and tank to said cylinder when said engine is running and for admitting pressure from said tank alone when the engine is idle.

4. In a fluid control system, a part to be operated, a cylinder, a piston therein connected to said part, an engine having a pump driven thereby to provide fluid under pressure for the system, a reserve pressure tank, a check valve between said tank and said engine for trapping pressure in said tank for use when said engine and pump are idle, a relief valve for controlling a return flow of fluid to said pump, and a manually controlled valve for admitting pressure fluid from said tank to said cylinder.

5. In a fluid control system, a part to be operated, such as a propeller or brake, a cylinder, a piston therein connected with said part and movable in said cylinder in one direction to set said part and movable in the opposite direction to release said part, a source of pressure fluid supply, a manually controlled pressure-reversing valve, and valves controlling the influx and escape of fluid from said cylinder arranged to operate upon the application of pressure in one direction from the external source through the opening of said manual valve to admit fluid at one end and allow the escape of fluid at the other end so that said piston is moved to move said part, but arranged to close upon the lapse of such pressure and open to reverse the movement of said piston when the direction of pressure fluid is reversed by the reversing of said valve.

6. In a fluid control system, a part to be operated, such as a propeller or brake, a cylinder, a piston therein connected with said part and movable in said cylinder in one direction to set said part and movable in the opposite direction to release said part, a source of pressure fluid supply, a manually controlled valve, and valves controlling the influx and escape of fluid from said cylinder arranged to operate upon the application of pressure from the external source through the opening of said manual valve to admit fluid at one end and allow the escape of fluid at the other end so that said piston is moved to move said part, but arranged to close upon the lapse of such pressure to hold said piston and the attached part from further movement by preventing the escape of fluid from in front of the piston or the influx of fluid in back thereof.

7. In a fluid control system, a part to be operated such as a propeller or brake, a cylinder, a piston therein connected with said part and movable in said cylinder one way to set said part and movable the other way to release said part, a source of pressure fluid supply, a manually controlled valve, and automatic valves controlling the influx of fluid to said cylinder and the escape of fluid therefrom in front and in back of said piston serving to lock said piston in any desired adjusted position when the pressure is cut off by the closing of said manual valve.

8. In a fluid control system, a part to be operated such as a propeller or brake, a cylinder, a piston therein connected with said part and movable in said cylinder one way to set said part and movable the other way to release said part, a source of pressure fluid supply, a manually controlled valve, and automatic valves controlling the influx of fluid to said cylinder in front of said piston and the escape of fluid therefrom from behind said piston, said valves being sensitive to external pressure to open and permit the movement of said piston, but being unaffected and remaining closed in the event of pressure inside said cylinder due to a tendency of said piston to move by a tendency toward movement of the part connected therewith.

9. In a fluid control system, a part to be operated, such as a propeller or brake, a cylinder, a piston therein connected with said part and movable one way to set said part and movable the other way to release said part, a source of pressure fluid supply derived from the operation of the engine on the vehicle whereon said system is installed, a reserve source of pressure fluid supply stored in the operation of said engine and trapped to be available when the latter is idle, a manual control valve for drawing on said pressure supplies, and automatic valves controlling the influx of fluid to said cylinder and the escape of fluid therefrom in front of and behind said piston to lock said piston in any desired adjusted position when the pressure is cut off by said manual valve.

10. In a fluid control system, a part to be operated such as a propeller or brake, a cylinder, a piston therein connected with said part and movable in said cylinder one way to set said part and movable the other way to release said part, a source of pressure fluid supply, a manually controlled valve to admit fluid from said source to one end of said cylinder, a second manually controlled valve to admit fluid from said source to the other end of said cylinder, and automatic valves opening to admit fluid to said cylinder at one end in back of said piston and allow the escape of fluid from in front of said piston, said valves being normally closed against pressure in said cylinder.

11. In a fluid control system, a part to be operated such as a propeller or brake, a cylinder, a piston therein connected with said part and movable in said cylinder one way to set said part and movable the other way to release said part, a source of pressure fluid supply, a manually controlled valve to admit fluid from said source to one end of said cylinder, a second manually controlled valve to admit fluid from said source to the other end of said cylinder, and a rocking member for selectively opening either of said manually controlled valves.

12. In a fluid control system, a part to be operated such as a propeller or brake, a cylinder, a piston therein connected with said part and movable in said cylinder one way to set said part and movable the other way to release said part, a source of pressure fluid supply, a manually controlled valve to admit fluid from said source to one end of said cylinder, a second manually controlled valve to admit fluid from said source to the other end of said cylinder, automatic valves opening to admit fluid to said cylinder at one end in back of said piston and allow the escape of fluid from in front of said piston, and a manual control piece for selectively operating either of said manually controlled valves.

13. In a fluid control system, a part to be operated, piston means connected therewith, a cylinder having said piston operating two ways therein, a source of pressure fluid supply, means for establishing communication between said source and said cylinder on either side of said piston, and normally closing valves responsive to pressure operating to allow the influx of pressure fluid to one side of the piston and the escape from the other side to move said piston and to hold the piston from moving by sealing said cylinder at both ends when said pressure fluid is shut off.

14. In a control system of the character described, an operating piston, a cylinder therefor having an inlet and an outlet opening at each end thereof, conduits extending from each of said inlet openings to be selectively placed in communication with a source of pressure fluid supply to admit pressure fluid to either end of said cylinder as desired, check valves normally seating outwardly in said inlet openings, and valves normally closing each of said outlet openings having each a side subject to the pressure of the fluid admitted to the inlet opening of the cylinder at the other end thereof whereby they open to permit the escape of fluid from the cylinder at one end while fluid is entering the other end.

15. In a control system of the character described, an operating piston, a cylinder therefor having an inlet and exhaust opening at each end thereof, means for selectively establishing communication for either of said inlets with a source of pressure fluid supply, a spring-pressed check valve seating outwardly in each inlet opening normally closing the same, and spring-pressed plungers normally closing said outlet openings but movable to open said outlet openings by the action of the pressure of the fluid being admitted to the cylinder at the other end.

16. In a control system of the character described, a pressure cylinder having an inlet and outlet opening at each end, a piston movable back and forth therein, a source of pressure fluid supply, a valve casing between said cylinder and said source having two chambers each communicating with an inlet of said cylinder, a valve to admit pressure fluid to either chamber and hence to either end of said cylinder to move said piston in either direction as desired, and self-closing valves normally closing said inlet and outlet openings of said cylinder but operating to admit fluid under pressure through the inlet at one end of the cylinder and to permit fluid to escape through the outlet at the other end of the cylinder.

17. In a control system of the character described, a pressure cylinder having an inlet and outlet opening at each end, a piston movable back and forth therein, a source of pressure fluid supply, a valve casing between said cylinder and said source having two chambers, each communicating with an inlet of said cylinder, a valve to admit pressure fluid to either chamber and hence to either end of said cylinder to move said piston in either direction as desired, and means serving normally to maintain said chambers of said valve casing at atmospheric pressure except when fluid is admitted under pressure to the said chambers.

18. In a fluid control system of the character described, a cylinder, a piston movable back and forth therein to set and release a part such as a propeller or brakes, a source of pressure fluid supply, a control valve for establishing communication between said source and said cylinder, and valves for said cylinder movable under the pressure of the fluid caused to flow by the opening of said control valve to admit fluid to one end of said cylinder and move the piston forward therein and to allow the escape of fluid from the other end of said cylinder from in front of the piston, but closing automatically upon the release of pressure when said control valve is closed to seal the ends of the cylinder and hold the piston in its adjusted position.

19. In a system as described in claim 18, an atmospheric valve in combination with the control valve normally maintaining the valves of the cylinder subject to atmospheric pressure except when said control valve is opened.

20. In a system as described in claim 18, an atmospheric opening in combination with the control valve controlled by the latter normally maintaining the valves of the cylinder, subject to atmospheric pressure except upon the opening of said control valve.

21. In a control system of the character described, a source of pressure fluid supply, a cylinder having a piston made operative by said pressure fluid, a valve connected intermediate said source and said cylinder for admitting said fluid pressure to said cylinder, and likewise relieving said pressure fluid from said cylinder, said valve being operable to allow the admittance and the releasing of said fluid pressure through a common line of connection between said valve and said cylinder.

22. In a control system of the character described, a source of pressure fluid supply, a cylinder having a piston made operative by said pressure fluid, a valve mechanism connected intermediate said source and said cylinder, said valve mechanism having means for admitting said pressure fluid to said cylinder in a gradual increase or a gradual decrease in pressure from said source, thereby varying the effect of said pressure upon said piston in said cylinder.

23. In a control system of the character described, a source of pressure fluid supply, a cylinder having a piston made operative by said pressure fluid, a valve mechanism connected intermediate said source and said cylinder, said valve mechanism having means for admitting said pressure fluid to said cylinder in a gradual increase or a gradual decrease in pressure from said source, thereby varying the effect of said pressure upon said piston in said cylinder, means for releasing said pressure fluid from said cylinder, through the same valve mechanism.

24. In a control system of the character described, a source of pressure fluid supply, a cylinder having a piston operable by said pressure fluid, a line extending to said cylinder from said pressure source, a valve mechanism intermediate said source and said cylinder, said valve mechanism comprising a plurality of chambers and valves for admitting and releasing said pressure fluid and opposite sides of said piston in said cylinder, and means for allowing the pressure line to become the relief line between said valve mechanism and said cylinder by alternating the flow of the pressure fluid to opposite sides of said piston by said valve mechanism.

25. In a system as described in claim 18, a by-pass opening leading from the valves of the cylinder, controlled in the opening and closing of said control valve, to be more and more restricted in the opening of said valve and conversely in the closing thereof.

26. In a system as described in claim 18, a by-pass opening leading from the valves of the cylinder, controlled by said control valve, to be closed in the opening of said valve and opened in the closing of said valve.

27. In a fluid control system, a part to be operated such as a propeller or brake, a cylinder, a piston therein connected with said part and movable in opposite directions to set or release said part, a source of pressure fluid supply, lines connecting said cylinder with said source, a manually controlled valve and automatic valves for controlling the influx of fluid to said cylinder in front of said piston, and the escape of fluid therefrom from behind said piston, said valves opening only under pressure in the lines but not by pressure in the cylinder.

28. In a fluid control system, a part to be operated such as a propeller or brake, a cylinder, a piston therein connected with said part and movable in opposite directions to set or release said part, a source of pressure fluid supply, a manually controlled valve to admit fluid from said source to one end of said cylinder, a second manually controlled valve to admit fluid from said source to the other end of said cylinder, and means for selectively operating either of said valves separately.

29. In a fluid control system, a part to be operated such as a propeller or brake, a cylinder, a piston therein connected with said part and movable in opposite directions to set or release said part, a source of pressure fluid supply, a manually controlled valve to admit fluid from said source to one end of said cylinder, a second manually controlled valve to admit fluid from said source to the other end of said cylinder, and means for selectively operating either of said valves separately, said valves being insured against operation together.

30. In a control system of the character described, a pressure cylinder having an inlet opening and an outlet opening at the two ends, a valve for sealing each of said openings arranged to open to permit fluid to enter one end of said cylinder and leave the other end, upon the application of pressure in one direction, a piston in said cylinder moved in one direction by the influx and escape of fluid described, said piston being movable in the opposite direction upon a reversal of the direction of the pressure flow and said valves operating to close and secure said piston in its adjusted position upon the release of pressure.

31. In a control system of the character described, a pressure cylinder having an inlet opening and an outlet opening at the two ends, a valve for sealing each of said openings arranged to open to permit fluid to enter one end of said cylinder and leave the other end, upon the application of pressure in one direction, a piston in said cylinder moved in one direction by the influx and escape of fluid described, said piston being movable in the opposite direction upon a reversal of the direction of the pressure flow and said valves operating to close and secure said piston in its adjusted position upon the release of pressure, and manually controlled means for supplying pressure fluid in either direction as desired.

32. In a system of the character described, a pressure cylinder having openings in opposite ends, a pressure responsive member such as a piston in said cylinder, a connection between said piston and a part to be operated such as a propeller or brake, and a manually controlled means for introducing pressure fluid to said cylinder selectively to either end thereof, the fluid being admitted at one end and allowed to escape at the other end in the same amount, whereby to control the position of said piston, the fluid being capable of being prevented from movement after adjustment of said piston to retain the same in any desired adjusted position.

33. In a fluid control system of the character described, an operating piston, a cylinder therefor, a source of pressure fluid supply and manually controlled means for controlling the admission of fluid from said source to said cylinder to operate said piston, operating to introduce fluid under a given pressure upon initial operation of said means, followed by gradually increasing pressure on further operation of said means, and finally the full pressure of said source.

34. In a fluid control system of the character described, an operating piston, a cylinder therefor, a source of pressure fluid supply and manually controlled means for controlling the admission of fluid from said source to said cylinder to operate said piston, operating to introduce fluid under a given pressure upon initial operation of said means, followed by gradually increasing pressure on further operation of said means, and finally the full pressure of said source, the sequence of operations being reversed in the relieving of the pressure of said source in the releasing movement of said means.

35. In a control system of the character described, an operating piston having connection with a part to be operated such as a propeller or brake, a cylinder therefor, and a manually controlled means for supplying pressure to said cylinder to operate said piston, said means serving to introduce a given pressure on the initial operation thereof, followed by gradually increasing pressure and ending up with full pressure at the limit of operation of said means.

36. In a control system of the character described, an operating piston having connection with a part to be operated such as a propeller or brake, a cylinder therefor, and a manually controlled means for supplying pressure to said cylinder to operate said piston, said means serving to introduce a given pressure on the initial operation thereof, followed by gradually increasing pressure and ending up with full pressure at the limit of operation of said means, said means serving on its releasing movement to relieve the pressure to the piston in the reverse order from that first described.

37. In a control system of the character described, an operating piston connected with a part to be operated such as a propeller or brake, a cylinder therefor, a manually controlled means for supplying pressure fluid to said cylinder to operate said piston, a line communicating between said means and said cylinder, and a pressure relief port arranged to be gradually restricted in the operation of said means whereby pressure is supplied to said cylinder having a given value upon initial operation of said means, due to a by-passing of pressure fluid through said port, the first pressure being followed by a gradually increasing pressure as the port is more and more restricted in the further operation of said means.

38. In a control system of the character described, an operating piston connected with a part to be operated such as a propeller or brake, a cylinder therefor, a manually controlled means for supplying pressure fluid to said cylinder to operate said piston, a line communicating between said means and said cylinder, and a pressure relief port arranged to be gradually restricted in the operation of said means, whereby pressure is supplied to said cylinder having a given value upon initial operation of said means, due to a by-passing of pressure fluid through said port, the first pressure being followed by a gradually increasing pressure as the port is more and more restricted in the further operation of said means, maximum pressure being obtained in the course of the operation of said means when said port is entirely closed.

39. In a control system of the character described, a part to be operated such as a propeller or brake, a fluid actuated device associated with said part, a fluid pressure source, a fluid pressure control valve, a line affording communication between said source and said control valve, said line affording communication between said control valve and said fluid actuated device, said control valve when opened permitting free connection between said pressure source and said fluid actuated device by functioning to allow a variation of the pressure supplied to said fluid-actuated device.

40. In a fluid brake system of the character described, a manually controlled valve for controlling the application and release of pressure for operating a brake, a brake pedal for operating said valve, and an accelerator pedal for the vehicle on which said brakes are in operation, said brake pedal and accelerator pedal being interconnected whereby the brakes are released upon the operation of the accelerator pedal.

41. In a fluid brake system of the character described, a brake cylinder, a fluid pressure source, a manual control valve arranged when operated one way to introduce pressure fluid to said cylinder to apply the brakes and arrange when operated another way to release said brakes, the brakes being applied after application until the operation of said valve to release the same, a brake pedal for operating said valve, and an accelerator pedal interconnected with said brake pedal to insure the releasing movement of said valve upon movement of said accelerator pedal.

42. In a fluid brake system of the character described, a brake cylinder, a fluid pressure source, a manually controlled valve arranged to be operated one way to admit pressure fluid to said cylinder to apply the brakes, a brake pedal for operating said valve having a toe and heel portion, the depression of one portion serving to apply the brakes and the depression of the other portion serving to release the brakes.

43. In a fluid brake system of the character described, a brake cylinder, a fluid pressure source, a manually controlled valve arranged to be operated one way to admit pressure fluid to said cylinder to apply the brakes, a brake pedal for operating said valve having a toe and heel portion the depression of one portion serving to apply the brakes, and the depression of the other portion serving to release the brakes, and an accelerator pedal interconnected with the portion serving to release the brakes.

44. In a fluid brake system of the character described, a brake cylinder, a fluid pressure source, a manually controlled valve arranged to be operated one way to admit pressure fluid to said cylinder to apply the brakes, a brake pedal for operating said valve having a toe and heel portion, the depression of one portion serving to apply the brakes, and the depression of the other portion serving to release the brakes, an accelerator pedal interconnected with the portion serving to release the brakes, and means for insuring the separate operation of said valves by said brake pedal alone or the two pedals together.

45. In a fluid control system of the character described, a cylinder, a pressure responsive member therein such as a piston, a source of pressure fluid supply, a manually operated valve controlling the admission of pressure fluid from said source to said cylinder, an atmospheric opening normally maintaining the inlet of said cylinder at atmospheric pressure, and a valve operated upon the operation of said first mentioned valve for controlling said atmospheric opening.

46. In a fluid control system, a cylinder, a pressure responsive piston having connection with a part to be operated, a source of fluid pressure supply under manual control, a fluid pressure line leading from said source to the opposite ends of said cylinder for operating said piston in opposite directions, and a manual control device for said source and said cylinder operating to furnish a solid column or line of fluid operating in both directions in the opposite movements communicated to said piston, thus effecting a positive adjustment of the piston in both directions.

47. In a hydraulic brake or propeller controlling system, a source of pressure fluid operating continuously, a storage chamber, a relief valve between the storage chamber and the intake side of the pressure fluid source, a cylinder, a pressure responsive member therein, such as a piston, connected with the part to be operated, and a manually operated valve for admitting pressure fluid from said storage chamber to said cylinder.

48. In a pressure fluid control system for vehicles, an actuating control device, actuated devices at remote points on the vehicle, fluid lines extending from said actuating device to the actuated devices, and means for relieving lines of fluid pressure after the operation of said actuating devices.

49. In a pressure fluid system of the character described, a continuously operated pumping device, such as the oil pump of a vehicle engine, a pressure storage tank, a supply connection for said pump receiving a non-freezing fluid, such as lubrication oil, a pressure line leading to said tank from said pump, a manually controlled master valve having communication with said storage tank, a pressure relief valve between said storage tank and the intake side of said pump, pressure lines from said master valve to the brake cylinder, and a drain connection for said master valve to the intake side of said pump.

50. In a pressure fluid system of the character described, a continuously operated pumping device, such as the oil pump of a vehicle engine, a pressure storage tank, a supply connection for said pump receiving a non-freezing fluid, such as lubrication oil, a pressure line leading to said tank from said pump, a check valve in said line, a manually controlled master valve having communication with said storage tank, a pressure relief valve between said storage tank and the intake side of said pump, pressure lines from said master valve to the brake cylinders, and a check valve in said drain connection.

In testimony whereof I affix my signature.

ERNEST G. McCAULEY.